United States Patent
Jun et al.

(10) Patent No.: US 11,654,885 B2
(45) Date of Patent: May 23, 2023

(54) COASTING REGENERATION CONTROL METHOD AND DEVICE OF VEHICLE WITH CONTINUOUSLY VARIABLE VALVE DURATION ENGINE

(71) Applicant: HYUNDAI KEFICO CORPORATION, Gyeonggi-do (KR)

(72) Inventors: Young Ho Jun, Seoul (KR); Jung Min Yoon, Gyeonggi-do (KR)

(73) Assignee: Hyundai Kefico Corporation, Gyeonggi-Do (KR)

( * ) Notice: Subject to any disclaimer, the term of this patent is extended or adjusted under 35 U.S.C. 154(b) by 31 days.

(21) Appl. No.: 17/363,888

(22) Filed: Jun. 30, 2021

(65) Prior Publication Data
US 2022/0024441 A1    Jan. 27, 2022

(30) Foreign Application Priority Data

Jul. 27, 2020 (KR) .................. 10-2020-0093349

(51) Int. Cl.
*B60W 20/14* (2016.01)
*B60K 6/24* (2007.10)
(Continued)

(52) U.S. Cl.
CPC ............... *B60W 20/14* (2016.01); *B60K 6/24* (2013.01); *B60K 6/26* (2013.01); *B60L 7/18* (2013.01); *B60W 30/18072* (2013.01); *B60W 2510/0638* (2013.01); *B60W 2520/10* (2013.01); *B60W 2540/10* (2013.01); *B60W 2540/12* (2013.01);
(Continued)

(58) Field of Classification Search
CPC .......... B60W 20/14; B60W 30/18072; B60W 30/18127; B60W 30/18136; F02D 13/02; F02D 13/0203; F02D 13/0261; F02D 13/0215; F02D 13/04
See application file for complete search history.

(56) References Cited

U.S. PATENT DOCUMENTS 5,899,828 A * 5/1999 Yamazaki ................ B60K 6/24
   903/905
5,961,418 A * 10/1999 Taniguchi .............. B60K 6/543
   903/918

(Continued)

FOREIGN PATENT DOCUMENTS

JP    2008-189302 A    8/2008
JP    2009-280091 A    12/2009
(Continued)

*Primary Examiner* — Carl C Staubach
(74) *Attorney, Agent, or Firm* — Fox Rothschild LLP

(57) ABSTRACT

A coasting regeneration control method of a vehicle equipped with a continuously variable valve duration (CVVD) engine includes: determining, by an engine control unit (ECU), whether a current state of the vehicle satisfies coasting regeneration conditions; and entering, by the ECU, a coasting regeneration mode and performing regenerative braking when the current state of the vehicle satisfies the coasting regeneration conditions, in which when the coasting regeneration mode is entered, a throttle valve is fully opened so that the amount of intake air of the engine is maximized, a CVVD target duration is controlled to be maximized, and a closing time of an intake valve is delayed after a start point of time of a compression stroke, thereby decreasing pumping loss of the engine.

6 Claims, 2 Drawing Sheets

(51) Int. Cl.
*B60L 7/18* (2006.01)
*B60K 6/26* (2007.10)
*B60W 30/18* (2012.01)

(52) U.S. Cl.
CPC ...... *B60W 2540/16* (2013.01); *B60Y 2200/92* (2013.01); *B60Y 2300/18125* (2013.01)

(56) References Cited

U.S. PATENT DOCUMENTS

| | | | |
|---|---|---|---|
| 6,026,921 A * | 2/2000 | Aoyama | B60W 10/02 903/918 |
| 2004/0025835 A1* | 2/2004 | Sieber | B60W 10/18 180/65.285 |
| 2008/0105477 A1* | 5/2008 | Abe | B60K 6/365 180/65.265 |
| 2012/0304962 A1* | 12/2012 | Tumelaire | F02D 41/1497 123/349 |
| 2017/0292460 A1* | 10/2017 | Nishida | F02B 63/04 |

FOREIGN PATENT DOCUMENTS

| | | |
|---|---|---|
| JP | 2019-031175 A | 2/2019 |
| KR | 2017-0069798 A | 6/2017 |
| KR | 2018-0039445 A | 4/2018 |
| KR | 10-2019-0072802 A | 6/2019 |
| KR | 2019-0062975 A | 6/2019 |

* cited by examiner

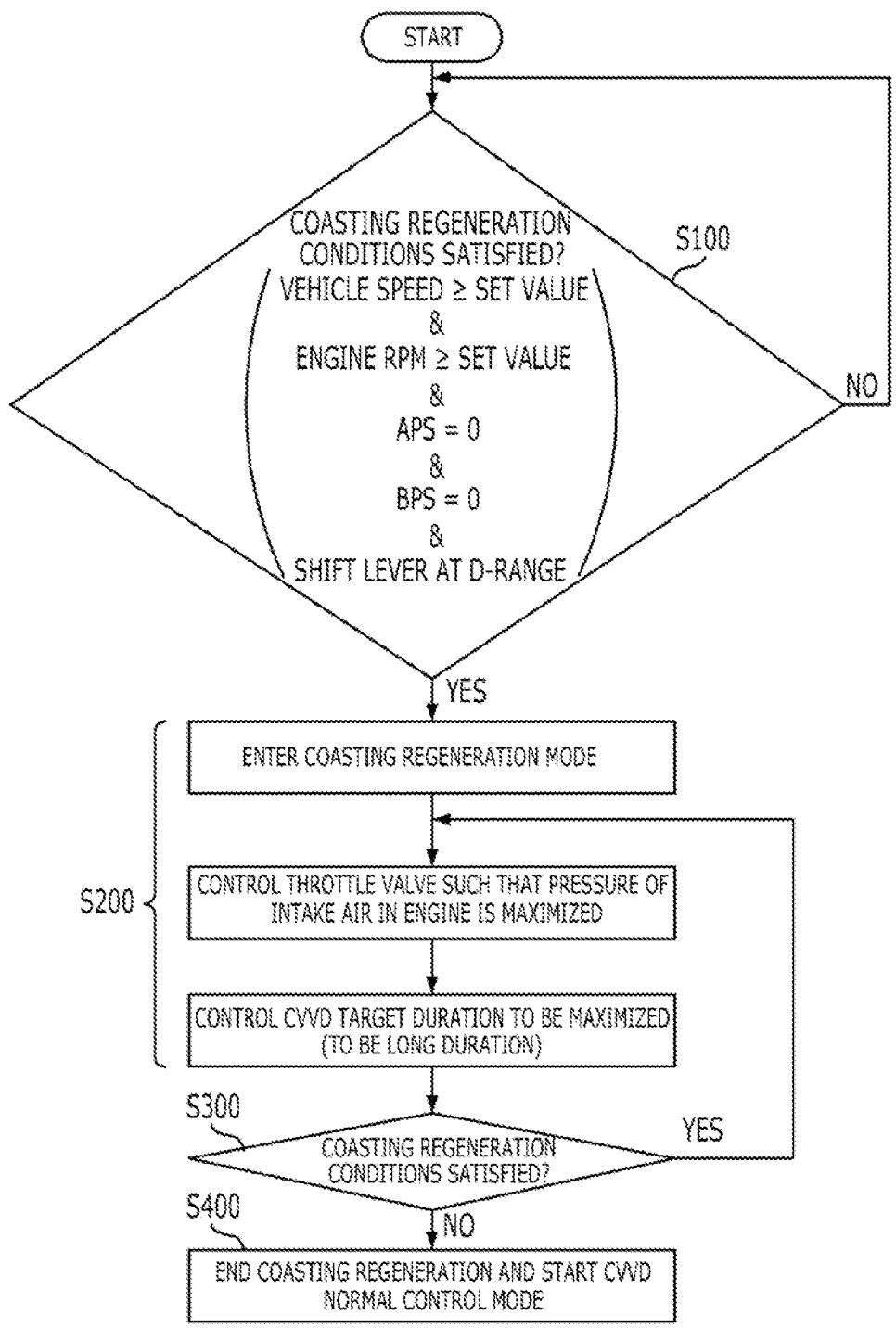

COASTING REGENERATION CONTROL METHOD AND DEVICE OF VEHICLE WITH CONTINUOUSLY VARIABLE VALVE DURATION ENGINE

CROSS REFERENCE TO RELATED APPLICATION

The present application claims under 35 U.S.C. § 119(a) the benefit of Korean Patent Application No. 10-2020-0093349, filed Jul. 27, 2020, the entire contents of which are incorporated by reference herein.

BACKGROUND

(a) Technical Field

The present disclosure relates to a coasting regeneration control method and device of a vehicle, more particularly, to the coasting regeneration control method and device of a mild hybrid electric vehicle (MHEV) equipped with a continuously variable valve duration (CVVD) engine.

(b) Description of the Related Art

Exhaust gas regulations for vehicles have become more stringent recently in order to improve the environment. However, existing powertrains based on a gasoline engine have limited ability to satisfy the exhaust gas regulations. Studies and development are actively being conducted of new powertrain systems for satisfying the exhaust gas regulations that are increasingly enhanced.

One of several technologies for satisfying the exhaust gas regulations that are enhanced is a mild hybrid electric vehicle (MHEV) system configured such that a belt driven motor (BDM) can assist engine power. An MHEV system equipped with a BDM is advantageous in terms of costs unlike a full hybrid system.

In particular, by utilizing an MHEV system with a BDM, it is possible to achieve benefits of a hybrid system and increase the fuel efficiency of a powertrain without significant changes to the powertrain, e.g., only by replacing an alternator (power generator) of existing internal combustion engines with a BDM.

However, according to a conventional MHEV system, since a motor (i.e., the BDM) is always connected to a crankshaft of an engine through a belt, there is a problem in that the engine acts like a resistor (i.e., including friction resistance, load, etc. of the engine) in regenerative braking. Accordingly, there is a defect that the regenerative braking efficiency decreases in comparison to other hybrid vehicles.

According to common hybrid systems, a motor is separated from an engine and independently performs regenerative braking through power generation control. In this case, since the engine is stopped, the engine does not have any influence on driving. However, since a BDM is connected to the crankshaft of the engine in an MHEV, friction torque and load of the engine simultaneously act in regenerative braking, so there is limitation in increasing the regenerative braking efficiency.

Further, in a coasting regeneration situation (in which a motor generates power while a vehicle coasts without an accelerator pedal or a brake pedal being depressed), power generation torque by a BDM and drag torque of an engine are simultaneously applied to a power shaft. Accordingly, when the power generation torque of the BDM is increased, a driver feels a driving difference due to relatively large deceleration in comparison to common internal combustion engine vehicles.

Further, since it is prescribed in rules such as WP29 by UNECE that brake lights should be turned on when deceleration of a vehicle is 1.3 m/s$^2$ or more, there is a limitation in increasing the amount of power generation of a BDM in a regenerative braking situation. Accordingly, there is a problem with a system in that a recovery ratio of energy is unavoidably low in a coasting regeneration situation.

SUMMARY

An object of the present disclosure is to provide a coasting regeneration control method and device of a vehicle equipped with a continuously variable valve duration (CVVD) engine, the method and device being able to decrease an influence on deceleration of the vehicle by drag torque of the engine in coasting regeneration, thereby being able to increase the amount of energy that is recovered by power generation of a motor even without adding a specific mechanical device.

In order to achieve the objectives, according to an aspect of the present disclosure, a coasting regeneration control method of a vehicle equipped with a continuously variable valve duration (CVVD) engine includes: (a) determining, by an engine control unit (ECU), whether a current state of the vehicle satisfies coasting regeneration conditions; and (b) entering, by the ECU, a coasting regeneration mode and performing regenerative braking when the current state of the vehicle satisfies the coasting regeneration conditions, in which when the coasting regeneration mode is entered, a throttle valve is fully opened so that the amount of intake air of the engine becomes maximum and a CVVD target duration is controlled to be maximized, whereby power generation torque of a BDM (Belt Driven Motor) is controlled to be increased.

In the step (a), when the current state of the vehicle is an over-run state, it may be determined that the coasting regeneration conditions are satisfied.

When an accelerator pedal and a brake pedal are not operated, so the output signals from an APS (Accelerator Position Sensor) and a BPS (Brake Position Sensor) are zero, and a vehicle speed and an engine RPM is over corresponding set vehicle speed and set RPM, the current state of the vehicle may be determined as the over-run state.

A condition in which a shift lever is positioned at a D-range may be further included in the over-run state.

In the step (b), a valve overlap in which both of an exhaust valve and an intake valve are open may be controlled to be maximized within a controllable range, a closing time of the intake valve may be delayed after a start point of time of a compression stroke (LIVC, Late Intake Valve Closure), thereby decreasing pumping loss and increasing power generation torque of the BDM.

The method may further include: (c) continuously monitoring whether the coasting regeneration conditions are satisfied when the vehicle is driven in a coasting regeneration mode; and (d) ending the coasting regeneration mode when an over-run state, which is one of the coasting regeneration conditions, as the result of monitoring.

In order to achieve the objectives, according to another aspect of the present disclosure, a coasting regeneration control device of a vehicle equipped with a continuously variable valve duration (CVVD) engine includes: a data detector detecting in real time information for determining whether a coasting regeneration mode is entered; an ECU determining whether the coasting regeneration mode has been entered by analyzing the information provided from the data detector; and a CVVD controller controlling a valve duration in the coasting regeneration mode under control of the ECU, in which the coasting regeneration mode is entered under control of the ECU when a current state of the vehicle satisfies coasting regeneration conditions as the result of analyzing the information provided from the data detector, and, in the coasting regeneration mode, a throttle valve is fully opened so that the amount of intake air of the engine becomes maximum under control of the ECU and the CVVD controller controls a CVVD target duration to be maximized, whereby power generation torque of a belt driven motor (BDM) is controlled to be increased.

The information that is detected by the data detector to enter the coasting regeneration mode may include at least one of of APS (Accelerator Position Sensor) information, BPS (Brake Position Sensor) information, vehicle speed information, engine RPM information, or shift gear information.

In an over-run state in which an accelerator pedal and a brake pedal are not operated, so the output signals from an APS (Accelerator Position Sensor) and a BPS (Brake Position Sensor) are zero, and a vehicle speed and an engine RPM is over corresponding set vehicle speed and set RPM, the ECU may determine that the current state of the vehicle satisfies the coasting regeneration conditions.

When the coasting regeneration mode is entered, the CVVD controller may control a valve overlap in which both of an exhaust valve and an intake valve are open to be maximized within a controllable range, and may delay a closing time of the intake valve after a start point of time of a compression stroke (LIVC, Late Intake Valve Closure), thereby decreasing pumping loss of engine and increasing power generation torque of the BDM.

The ECU may continuously monitor whether the coasting regeneration conditions are satisfied on the basis of the information provided in real time from the data detector while controlling the CCVD target duration to be maximized through the CVVD controller, and the CVVD controller may control a valve duration of an intake valve to follow a target value output from mapping data in accordance with a current driving state under control of the ECU when an over-run state that is one of the coasting regeneration conditions is removed as the result of monitoring.

According to the coasting regeneration control method and device of an MHEV equipped with a CVVD engine of the present disclosure, pumping loss is reduced by controlling a valve duration in a coasting regeneration, thereby being able to decrease drag torque of an engine and increase the power generation amount of a BDM. Accordingly, it is possible to improve fuel efficiency.

That is, according to the present disclosure, it is possible to reduce the pumping loss by controlling the valve direction in a coasting regeneration situation, whereby it is possible to decrease the influence on deceleration of a vehicle by the drag torque of an engine in a coasting regeneration situation and it is also possible to increase the amount of energy that is recovered by power generation of the motor without adding a specific mechanical device. That is, it is possible to greatly improve the fuel efficiency of a vehicle even without adding a specific mechanical device.

BRIEF DESCRIPTION OF THE DRAWINGS

The above and other objectives, features and other advantages of the present disclosure will be more clearly understood from the following detailed description taken in conjunction with the accompanying drawings, in which:

FIG. 3 is a flowchart showing a coasting regeneration control method of a vehicle equipped with a continuously variable valve duration (CVVD) engine according to an embodiment of the present disclosure.

DETAILED DESCRIPTION OF THE DISCLOSURE

Figure 1:
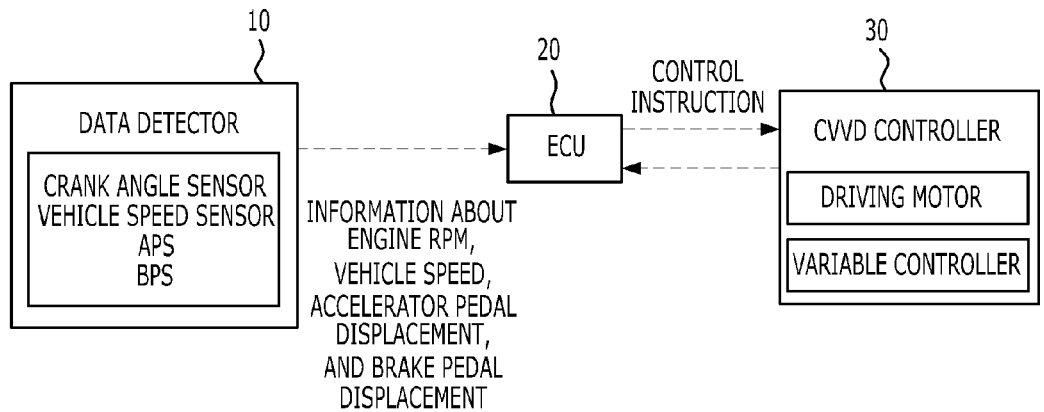
FIG. 1 is a diagram schematically showing the configuration of a coasting regeneration control device of a vehicle equipped with a continuously variable valve duration (CVVD) engine according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure are described in detail with reference to the accompanying drawings.

The terminology used herein is for the purpose of describing particular embodiments only and is not intended to limit the present disclosure. Singular forms are intended to include plural forms unless the context clearly indicates otherwise.

Terms used in the specification, 'first', 'second', etc., may be used to describe various components, but the components are not to be construed as being limited to the terms. The terms are used only to distinguish one component from another component.

In the following description referring to the accompanying drawings, the same components are given the same reference numerals and are not repeatedly described. However, in describing the present disclosure, detailed descriptions of well-known technologies will be omitted so as not to obscure the description of the present disclosure with unnecessary detail FIG. 1 is a diagram schematically showing the configuration of a coasting regeneration control device of a vehicle (e.g., a mild hybrid electric vehicle, or MHEV) equipped with a continuously variable valve duration (CVVD) engine according to an embodiment of the present disclosure;

Referring to FIG. 1, a coasting regeneration control device according to an embodiment of the present disclosure, which is applied to a mild hybrid electric vehicle including a CVVD system and a belt driven motor (BDM) connected to an output shaft of an engine to be able to transmit and receive power to and from the engine, includes a data detector 10, an engine control unit (ECU) 20, and a CVVD controller 30.

The data detector 10 detects in real time information for determining whether a coasting regeneration mode is entered. The information that is detected by the data detector 10 to determine whether a coasting regeneration mode is entered may include at least one of Accelerator Position Sensor (APS) information, Brake Position Sensor (BPS) information, vehicle speed information, engine RPM information, or shift gear information.

The information detected by the data detector 10 is provided to the ECU 20, and the ECU 20 analyzes the information provided from the data detector 10. In particular, the ECU 20 determines whether a coasting regeneration mode is entered by analyzing the information provided from the data detector 10, and determines that the coasting regeneration mode has been entered when the current vehicle state determined from the information transmitted from the data detector 10 is an over-run state.

An "over-run" refers to a situation in which a vehicle is driven using only inertia without an accelerator pedal and a brake pedal operated. In particular, over-run may be a coasting drive situation in which APS and BPS outputs are zero, and the vehicle speed and the engine RPM exceed a corresponding vehicle speed and a set RPM.

Depending on a particular case, the over-run state may include a condition in which a shift lever is at the D-range, but the conditions for determining whether the coasting regeneration mode is entered are not limited only to the conditions described above. New conditions may be added to the condition described above, depending on a vehicle specification, and some of the conditions described above may be excluded, depending on the particular case.

The CVVD controller 30 controls valve duration under control of the ECU 20. The CVVD controller 30 may be composed of a driving motor generating and outputting appropriate torque for controlling the valve duration under control of the ECU 20, and a variable controller operated to change the rotational center of a camp shaft by the driving motor. The CVVD controller 30 is well known in the art, so the detailed description is omitted.

For reference, CVVD (Continuous Variable Valve Duration) is a technology of increasing the general performance by freely controlling duration for which an intake valve is open. In other words, CVVD controls the duration for which a valve is open using a difference in speed of a cam pressing the valve when a rotational center of a camshaft is moved.

The ECU 20, as described above, determines whether the coasting regeneration mode has been entered on the basis of the detection information provided from the data detector 10. When the vehicle state is the over-run state described above, the ECU 20 determines that the coasting regeneration conditions are satisfied, and determines that the coasting regeneration mode has been entered and performs a series of control for coasting regeneration.

The series of control performed by the ECU 20 in the coasting regeneration mode, which is control for increasing the power generation torque of the BDM, includes engine throttle valve control and valve duration control through the CVVD controller 30. To this end, simultaneously with entry of the coasting regeneration, the ECU 20 transmits a control signal for increasing the power generation torque of the BDM in regenerative braking to the engine throttle valve and the CVVD controller 30.

In particular, simultaneously with entry of the coasting regeneration mode, the ECU 20 fully opens a throttle valve so that the amount of intake air of the engine is maximized. Further, the ECU 20 outputs an instruction to maximize the target duration of the CVVD within an allowable duration range to the variable controller of the CVVD controller 30.

To this end, the ECU 20 may be equipped with one or more processors that are operated in accordance with set programs. In particular, the ECU 20 may be equipped with one or more processors that are operated by programs constructed to perform the steps of the coasting regeneration control method of a vehicle (e.g., an MHEV) equipped with a CVVD engine according to an embodiment of the present disclosure to be described below.

The CVVD controller 30 delays the closing time of the intake valve after the start point of time of a compression stroke in accordance with the instruction from the ECU 20 when the coasting regeneration mode is entered (LIVC, Late Intake Valve Closure). Further, valve overlap in which both of an exhaust valve and an intake valve are open is controlled to be maximized within a controllable range (controlled like the curve ① in FIG. 2).

This is described with reference to FIG. 2.

Figure 2:
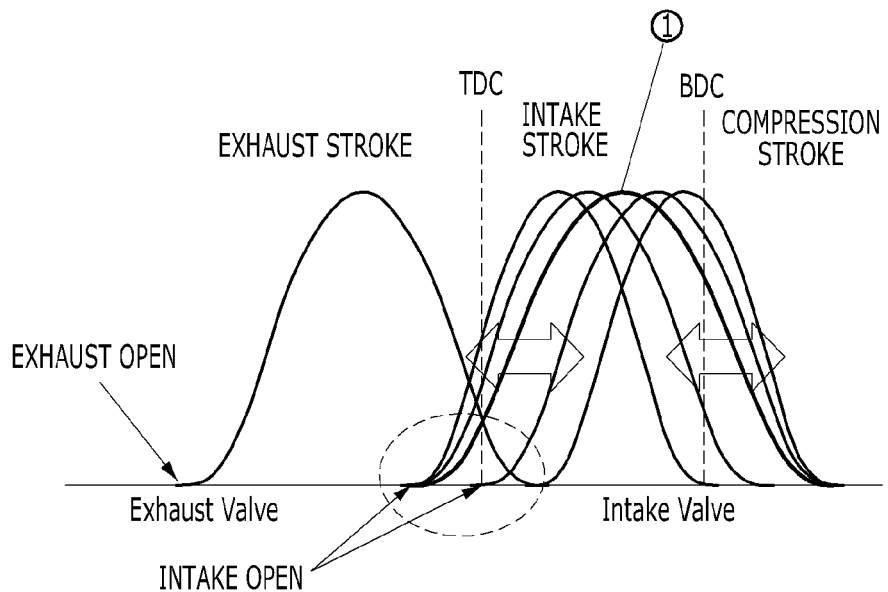
FIG. 2 is a graph showing a change in an intake valve when a coasting regeneration mode is entered.

FIG. 2 is a graph showing a change in an intake valve when a coasting regeneration mode is entered.

As shown in FIG. 2, simultaneously with entry of the coasting regeneration mode, the CVVD controller 30 controls the valve overlap (region indicated by an ellipse) in which the exhaust valve and the intake valve are both open to be maximized within the controllable range in accordance with the instruction from the ECU 20. Further, the closing time of the intake valve is delayed after the start point of time of a compression stroke (usually corresponding to a BDC).

For reference, valve overlap refers to a state in which the exhaust valve and the intake valve are both open so as to improve the intake/exhaust efficiency in the region where the engine rotated at a high speed, so malfunction of an engine can be prevented. That is, an engine can operate and output high power without a problem in a high-speed rotation region due to the valve overlap.

When the closing time of the intake valve is delayed after the start point of time of a compression stroke, as shown in FIG. 2, some of the intake air flowing in a combustion chamber in an intake stroke is forcibly discharged out of the combustion chamber in the compression stroke, so slight output reduction is unavoidable, but the effective compression start point is correspondingly delayed. Accordingly, the expansion ratio to the compression ratio increases and combustion heat does more work. Further, negative work in the compression stroke decreases, so pumping loss decreases.

Braking torque that is applied to a power shaft in the coasting regeneration situation (in which the BDM generates power with a vehicle coasting without the accelerator pedal and brake pedal depressed) is the sum of the power generation torque of the BDM and the drag torque of the engine. Accordingly, when the drag torque of the engine is reduced, deceleration of the vehicle can be maintained even if the power generation torque of the BDM is increased by the reduced torque.

The drag torque of the engine is composed of friction torque of the engine and pumping loss. The pumping loss, which is a pressure loss due to negative pressure generated in the intake manifold of an engine, can be reduced by controlling the duration of the intake valve, as described above, e.g., by increasing the period for which both of the exhaust valve and the intake valve are open and the opening amount of the intake valve.

When the period for which both of the exhaust valve and the intake valve are open and the opening amount of the intake valve are increased, more air flows into a cylinder, so the internal pressure of the cylinder increases. Further, the pressure difference between the intake manifold and the exhaust manifold decreases, so the pumping loss is reduced. As a result, the drag torque of the engine (load applied to the engine) can be actively reduced.

The present disclosure has been made considering that the drag torque of an engine can be controlled by CVVD control, in which when the coasting regeneration mode is entered, the ECU 20 controls the CVVD controller 30 such that the duration of the intake valve increases, whereby the pumping loss decreases and the drag torque of the engine is reduced to increase the amount of power generation of the BDM.

As described above, when the duration of the intake valve is increased and more air flows into a cylinder, the intake valve cannot flow smoothly if throttle valve of the engine is closed even a little, so the valve duration control may be influenced. Accordingly, the throttle valve is fully closed simultaneously with entry of the coasting regeneration mode to prevent the intake air from influencing the valve duration control.

For reference, the curve ① shown in FIG. 2 is the curve exemplifying the change of an intake valve when a coasting regeneration mode is entered that is proposed in the present disclosure, and other curves (curves for intake valves) are curves exemplifying changes of various types of intake values that may be shown in accordance with the driving states of vehicles. The larger the width between the start point and the end point (the left-right width in FIG. 2) of each of the curves, the longer the time for which the valve is open.

The ECU 20 continuously monitors whether the coasting regeneration conditions are satisfied on the basis of the information provided in real time by the data detector 10 while controlling a CVVD target duration to be maximized (the duration of the intake valve to be increased) through the CVVD controller 30, and changes the CVVD into a normal control mode when determining that the over-run state that is one of the coasting regeneration conditions has been removed as the monitoring result.

For example, when operation of an accelerator pedal or a brake pedal is detected (when the output signal of the APS or the BPS is not 0) while a vehicle is driven in the coasting regeneration mode (with the throttle valve fully open or the CVVD target duration controlled to be maximized), the ECU 20 gives an instruction to the CVVD controlled to enter a normal CVVD control mode in which the valve duration of the intake valve is made follow a target value output from mapping data in accordance with the current driving state of the vehicle.

However, when it is determined that the over-run state, which is one of the coasting regeneration conditions, is maintained, the pumping loss is reduced by controlling the CVVD target duration to be maximized, thereby maintaining the coasting regeneration mode that increase the amount of power generation of the BDM.

A regeneration control method that is performed by the coasting regeneration control device of an MHEV with a CVVD engine according to an embodiment of the present disclosure described above is described with reference to FIG. 3.

FIG. 3 is a flowchart showing a coasting regeneration control method of a vehicle equipped with a CVVD engine according to an embodiment of the present disclosure.

Referring to FIG. 3, the coasting regeneration control method of an MHEV with a CVVD engine according to an embodiment of the present disclosure, in a broad meaning, may include determining whether the current state of a vehicle satisfies coasting regeneration conditions (S100), and entering the coasting regeneration mode and performing regenerative braking when the current state of the vehicle satisfies the coasting regeneration conditions (S200).

In step S100, when the current state of the vehicle is the over-run state, it is possible to determine that the coasting regeneration conditions are satisfied. The over-run state is a state in which an accelerator pedal and a brake pedal are not operated, so the output signals from the APS (Accelerator Position Sensor) and the BPS (Brake Position Sensor) are zero, and the vehicle speed and the engine RPM is over corresponding set vehicle speed and set RPM.

Depending on a particular case, the over-run state may include a condition in which a shift lever is at the D-range, but the conditions for determining whether the coasting regeneration mode is entered are not limited only to the conditions described above. New conditions may be added to the condition described above, depending on a vehicle specification, and some of the conditions described above may be excluded, depending on a particular case.

In step S200, when the current state of a vehicle satisfies the coasting regeneration conditions and the coasting regeneration mode is entered, the throttle valve is fully opened so that the amount of intake air of the engine becomes maximum and the CVVD target duration is controlled to be maximized, whereby the power generation torque of the BDM (Belt Driven Motor) is controlled to be increased.

Controlling the CVVD target duration to be maximized means that the valve overlap in which both of the exhaust valve and the intake valve are open is controlled to be maximized within the controllable range and the closing time of the intake valve is delayed after the start point of time of a compression stroke (LIVC, Late Intake Valve Closure), thereby decreasing the pumping loss.

As described above, braking torque that is applied to a power shaft in the coasting regeneration situation (in which the BDM generates power with a vehicle coasting without the accelerator pedal and brake pedal depressed) is the sum of the power generation torque of the BDM and the drag torque of the engine. Accordingly, when the drag torque of the engine is reduced, deceleration of the vehicle can be maintained even if the power generation torque of the BDM is increased by the reduced torque.

The drag torque of the engine is composed of friction torque of the engine and pumping loss. The pumping loss, which is a pressure loss due to negative pressure generated in the intake manifold of an engine, can be reduced by controlling the duration of the intake valve, as described above (by increasing the period for which both of the exhaust valve and the intake valve are open and the opening amount of the intake valve).

When the period for which both of the exhaust valve and the intake valve are open and the opening amount of the intake valve are increased, more air flows into a cylinder, so the internal pressure of the cylinder increases. Further, the pressure difference between the intake manifold and the exhaust manifold decreases, so the pumping loss is reduced. Accordingly, it is possible to actively reduce the drag torque of the engine (load applied to the engine).

The present disclosure has been made in consideration of that the drag torque of an engine can be controlled by CVVD control, in which when the coasting regeneration mode is entered, the ECU 20 controls the CVVD controller 30 such that the duration of the intake valve increases, whereby the pumping loss decreases and the drag torque of the engine is reduced to increase the amount of power generation of the BDM.

As described above, when the duration of the intake valve is increased and more air flows into a cylinder, the intake valve cannot flow smoothly if throttle valve of the engine is closed even a little, so the valve duration control may be influenced. Accordingly, the throttle valve is fully closed with simultaneously with entry of the coasting regeneration mode to prevent the intake air from influencing the valve duration control.

Meanwhile, the control method of the present disclosure continuously monitors whether the coasting regeneration conditions are satisfied when a vehicle is driven in the coasting regeneration mode (S300). When it is determined that the over-run state that is one of the coasting regeneration conditions has been removed as the result of monitoring, the coasting generation mode is ended and the CVVD control mode is changed into the normal control mode (S400).

For example, when operation of an accelerator pedal or a brake pedal is detected (when the output signal of the APS or the BPS is not 0) while a vehicle is driven in the coasting regeneration mode (with the throttle valve fully open or the CVVD target duration controlled to be maximized), a normal CVVD control mode in which the valve duration of the intake valve is made follow a target value output from mapping data in accordance with the current driving state of the vehicle is started.

However, when it is determined that the over-run state, which is one of the coasting regeneration conditions, is maintained, the pumping loss is reduced by controlling the CVVD target duration to be maximized, thereby maintaining the coasting regeneration mode that increase the amount of power generation of the BDM.

In general, according to an MHEV system, a motor is connected to the crankshaft of an engine through a belt, so the power shaft of the motor cannot be separated from the engine in coasting generation. Accordingly, power generation torque of the motor and drag torque of the engine are both applied to the power shaft, so when the power generation torque of the motor is increased, a deceleration amount is correspondingly increases, whereby a driver may feel a driving difference.

Therefore, the power generation amount by a motor is unavoidably limited in coasting regeneration in the MEHV system of the related art. However, according to the present disclosure, in coasting regeneration, the pumping loss is decreased by controlling the valve duration, whereby it is possible to reduce the drag torque of an engine. Further, it is possible to increase the power generation amount of the BDM by the reduced drag torque, so the fuel efficiency can be improved.

That is, according to the present disclosure, it is possible to reduce the pumping loss by controlling the valve direction in a coasting regeneration situation, whereby it is possible to decrease the influence on deceleration of a vehicle by the drag torque of an engine in a coasting regeneration situation and it is also possible to increase the amount of energy that is recovered by power generation of the motor without adding a specific mechanical device. That is, it is possible to greatly improve the fuel efficiency of a vehicle even without adding a specific mechanical device.

Only a specific embodiment was described in the above detailed description. The present disclosure should not be construed as being limited to the specific embodiment described above, but should be construed as including all changes, equivalents, and substitutions within the spirit of the present disclosure defined in the claims.

What is claimed is:

1. A coasting regeneration control method of a vehicle equipped with a continuously variable valve duration (CVVD) engine, in which an engine control unit (ECU) controls regenerative braking in the vehicle, the method comprising the steps of:
    determining, by the ECU, whether a current state of the vehicle satisfies coasting regeneration conditions;
    entering, by the ECU, a coasting regeneration mode and performing regenerative braking when the current state of the vehicle satisfies the coasting regeneration conditions;
    continuously monitoring whether the coasting regeneration conditions are satisfied when the vehicle is driven in a coasting regeneration mode; and
    ending the coasting regeneration mode when an over-run state that is one of the coasting regeneration conditions is removed based on the monitoring,
    wherein when the current state of the vehicle is an over-run state, it is determined that the coasting regeneration conditions are satisfied,
    wherein when entering the coasting regeneration mode, a valve overlap in which both of an exhaust valve and an intake valve are open is controlled to be maximized within a controllable range, a closing time of the intake valve is delayed after a start point of time of a compression stroke, thereby decreasing pumping loss and increasing power generation torque of the BDM, and
    wherein when the coasting regeneration mode is entered, a throttle valve is fully opened so that an amount of intake air of the engine is maximized and a CVVD target duration is controlled to be maximized, such that power generation torque of a belt driven motor (BDM) is controlled to be increased.

2. The method of claim 1, wherein when output signals from an accelerator position sensor and a brake position sensor are zero, and a vehicle speed and an engine RPM are over a corresponding set vehicle speed and a set RPM, the current state of the vehicle is determined as the over-run state.

3. The method of claim 2, wherein a condition in which a shift lever is positioned at a D-range is further included in the over-run state.

4. A coasting regeneration control device of a vehicle equipped with a continuously variable valve duration (CVVD) engine, the device comprising:
   a data detector detecting in real time information for determining whether a coasting regeneration mode is entered;
   an engine control unit (ECU) determining whether the coasting regeneration mode has been entered by analyzing the information provided from the data detector; and
   a CVVD controller controlling a valve duration in the coasting regeneration mode under control of the ECU,
   wherein the coasting regeneration mode is entered under control of the ECU when a current state of the vehicle satisfies coasting regeneration conditions as a result of analyzing the information provided from the data detector,
   wherein in the coasting regeneration mode, a throttle valve is fully opened so that an amount of intake air of the engine is maximized under control of the ECU and the CVVD controller controls a CVVD target duration to be maximized, such that power generation torque of a belt driven motor (BDM) is controlled to be increased,
   wherein when the coasting regeneration mode is entered, the CVVD controller controls a valve overlap in which both of an exhaust valve and an intake valve are open to be maximized within a controllable range, and delays a closing time of the intake valve after a start point of time of a compression stroke, thereby decreasing pumping loss and increasing power generation torque of the BDM,
   wherein the ECU continuously monitors whether the coasting regeneration conditions are satisfied on the basis of the information provided in real time from the data detector while controlling the CCVD target duration to be maximized through the CVVD controller, and the CVVD controller controls a valve duration of an intake valve to follow a target value output from mapping data in accordance with a current driving state under control of the ECU when an over-run state that is one of the coasting regeneration conditions is removed as the result of monitoring.

5. The device of claim 4, wherein the information that is detected by the data detector to enter the coasting regeneration mode includes at least one of accelerator position sensor information, brake position sensor information, vehicle speed information, engine RPM information, or shift gear information.

6. The device of claim 4, wherein in an over-run state in which output signals from an accelerator position sensor and a brake position sensor are zero, and a vehicle speed and an engine RPM are over a corresponding set vehicle speed and a set RPM, the ECU determines that the current state of the vehicle satisfies the coasting regeneration conditions.

* * * * *